US012437009B2

(12) United States Patent
Jayaraman et al.

(10) Patent No.: US 12,437,009 B2
(45) Date of Patent: Oct. 7, 2025

(54) SYSTEMS FOR REDACTION OF DOCUMENTS IN A WEB-BASED COLLABORATIVE PLATFORM

(71) Applicant: Rocket Software Technologies, Inc., Waltham, MA (US)

(72) Inventors: Padmanaban Jayaraman, Chennai (IN); Bill Dulyk, Carmel, NY (US); Sudhi Balan, Carmel, NY (US)

(73) Assignee: Rocket Software Technologies, Inc., Waltham, MA (US)

(*) Notice: Subject to any disclaimer, the term of this patent is extended or adjusted under 35 U.S.C. 154(b) by 244 days.

(21) Appl. No.: 18/463,909

(22) Filed: Sep. 8, 2023

(65) Prior Publication Data

US 2024/0086469 A1   Mar. 14, 2024

Related U.S. Application Data

(60) Provisional application No. 63/405,827, filed on Sep. 12, 2022.

(51) Int. Cl.
*G06F 21/00* (2013.01)
*G06F 16/93* (2019.01)
*G06F 21/62* (2013.01)

(52) U.S. Cl.
CPC .......... *G06F 16/94* (2019.01); *G06F 21/6209* (2013.01)

(58) Field of Classification Search
CPC .............................. G06F 16/94; G06F 21/209
See application file for complete search history.

(56) References Cited

U.S. PATENT DOCUMENTS 8,364,712 B2 * 1/2013 O'Sullivan ......... G06F 21/6218
707/783
8,396,838 B2 * 3/2013 Brockway ........... G06F 21/6227
707/665

(Continued)

FOREIGN PATENT DOCUMENTS

CN   113343255 A  *  9/2021  ............. G06F 21/64
CN   119538181 A  *  2/2025  ............ G06V 10/757
WO   WO-2025015131 A2  *  1/2025  ............. G16H 50/30

OTHER PUBLICATIONS

Mofrad, Mohammad Hasanzadeh, et al., "Leveraging Intel SGX to Create a Nondisclosure Cryptographic library", ARXIV ID: 1705. 04706, Publication Date: May 12, 2017, pp. 1-14 (Year: 2017).*

(Continued)

*Primary Examiner* — Laurie A Ries
(74) *Attorney, Agent, or Firm* — Danielson Legal LLC (57) ABSTRACT

A device may store a plurality of documents in a source content library using a web-based, the plurality of documents in the source content library being unredacted and the plurality of documents in the source content library comprising a private content document, the private content document comprising unprivileged content and privileged content. A device may store a plurality of document hyperlinks in a target content retrieval library, the plurality of document hyperlinks being access hyperlinks for the plurality of documents in the source content library and the plurality of document hyperlinks comprising a private content document hyperlink, the private content document hyperlink being a hyperlink to the private content document. A device may automatically synchronize in real-time the plurality of documents in the source content library with the plurality of document hyperlinks in the target content retrieval library.

20 Claims, 6 Drawing Sheets

(56) References Cited

U.S. PATENT DOCUMENTS

| | | | | |
|---|---|---|---|---|
| 9,477,934 B2* | 10/2016 | Lehmann | | G06Q 10/06 |
| 11,212,347 B2* | 12/2021 | Zakrzewski | | H04L 63/101 |
| 11,775,666 B2* | 10/2023 | Balan | | H04L 63/101 |
| | | | | 726/1 |
| 2009/0112867 A1* | 4/2009 | Roy | | G06F 21/6254 |
| | | | | 707/999.009 |
| 2009/0129591 A1* | 5/2009 | Hayes | | G06F 21/608 |
| | | | | 380/51 |
| 2013/0152047 A1* | 6/2013 | Moorthi | | G06F 8/71 |
| | | | | 717/124 |
| 2014/0047234 A1* | 2/2014 | Davis | | G06Q 10/10 |
| | | | | 713/160 |
| 2017/0264440 A1* | 9/2017 | Li | | H04W 12/10 |
| 2020/0293685 A1* | 9/2020 | Levay | | G06F 16/258 |
| 2022/0131836 A1* | 4/2022 | Thomas | | H04L 63/20 |
| 2022/0197618 A1* | 6/2022 | Samuel | | G06F 8/51 |

OTHER PUBLICATIONS

Holzinger, Philipp, et al., "Hardening Java's Access Control by Abolishing Implicit Privilege Elevation", Digital Object Identifier: 10.1109/SP.2017.16, Publication Date: May 1, 2017, 2017 IEEE Symposium on Security and Privacy, pp. 1027-1040. (Year: 2017).*

* cited by examiner

FIG. 1

MOBIUS VIEW SHAREPOINT INTERFACE ARCHIVING SETTINGS

General Settings > Manage Archiving Jobs

| Name | Status | Recurring Schedule | Next Run Time |
|---|---|---|---|
| Archive Creation Job | Enable | Every 1 minutes | 8/3/2023 11:09:00 AM |
| Archive Maintenance Job | Enable | Every 1 minutes | 8/3/2023 11:09:00 AM |
| Redaction Job | Enable | Every 1 minutes | 8/3/2023 11:09:00 AM |

Archiving Templates

Archiving Policies

Automatic Archiving Defaults

General Settings

| Document Name ⌄ | Modified ⌄ | Created By ⌄ | + Add column |
|---|---|---|---|
| RedactionCheck1.txt | 8 hours ago | SharePoint App | |
| RedactionCheck1.txt | 8 hours ago | SharePoint App | |

FIG. 4

```
┌─────────────────────────────────────────────────────────────┐
│ Storing a plurality of documents in a source content        │
│ library using a web-based, the plurality of documents in    │──  510
│ the source content library being unredacted and the         │
│ plurality of documents in the source content library        │
│ comprising a private content document, the private content  │
│ document comprising unprivileged content and privileged     │
│ content                                                     │
└─────────────────────────────────────────────────────────────┘
                              ▼
┌─────────────────────────────────────────────────────────────┐
│ Storing a plurality of document hyperlinks in a target      │
│ content retrieval library, the plurality of document        │
│ hyperlinks being access hyperlinks for the plurality of     │── 520
│ documents in the source content library and the plurality   │
│ of document hyperlinks comprising a private content         │
│ document hyperlink, the private content document hyperlink  │
│ being a hyperlink to the private content document           │
└─────────────────────────────────────────────────────────────┘
                              ▼
┌─────────────────────────────────────────────────────────────┐
│ Automatically synchronizing in real-time the plurality of   │── 530
│ documents in the source content library with the plurality  │
│ of document hyperlinks in the target content retrieval      │
│ library                                                     │
└─────────────────────────────────────────────────────────────┘
                              ▼
┌─────────────────────────────────────────────────────────────┐
│ Receiving privacy redaction policies for the plurality of   │── 540
│ documents in the source content library, the privacy        │
│ redaction policies comprising a privacy governance policy   │
│ for the private content document                            │
└─────────────────────────────────────────────────────────────┘
                              ▼
┌─────────────────────────────────────────────────────────────┐
│ Receiving an access request from a non-privileged user to   │── 550
│ access the private content document                         │
└─────────────────────────────────────────────────────────────┘
                              ▼
┌─────────────────────────────────────────────────────────────┐
│ Accessing the private content document hyperlink in         │── 560
│ response to the access request from the non-privileged user │
│ to access the private content document                      │
└─────────────────────────────────────────────────────────────┘
                              ▼
┌─────────────────────────────────────────────────────────────┐
│ Applying the privacy governance policy to the private       │── 570
│ content document in-real time at a time of providing access │
│ to the private content document                             │
└─────────────────────────────────────────────────────────────┘
                              ▼
┌─────────────────────────────────────────────────────────────┐
│ Redacting the privileged content of the private content     │── 580
│ document at the time of providing access to the private     │
│ content document, the redacting based on the privacy        │
│ governance policy                                           │
└─────────────────────────────────────────────────────────────┘
                              ▼
┌─────────────────────────────────────────────────────────────┐
│ Displaying the private content document to the non-         │
│ privileged user using a user interface (ui), the displaying │── 590
│ the private content document comprising redacting the       │
│ privileged content at the time of the displaying the        │
│ private content document to the non-privileged user and     │
│ showing the unprivileged content to the non-privileged user │
└─────────────────────────────────────────────────────────────┘
```

SYSTEMS FOR REDACTION OF DOCUMENTS IN A WEB-BASED COLLABORATIVE PLATFORM

CROSS REFERENCE TO RELATED APPLICATION

This application claims the priority benefit of U.S. Provisional Patent Application Ser. No. 63/405,827 filed on Sep. 12, 2022. The aforementioned disclosure is hereby incorporated by reference herein in its entirety including all references cited therein.

FIELD OF THE TECHNOLOGY

The present disclosure relates to methods for personalized redaction of documents in a web-based collaborative platform. In some instances, the web-based collaborative platform is SharePoint.

BACKGROUND

Previous approaches for managing and providing access to sensitive documents have involved manual redaction processes and limited control over document access. In these approaches, documents were typically stored in separate repositories, making it difficult to synchronize changes and maintain consistency between the documents and their associated hyperlinks. Additionally, privacy redaction policies were often applied inconsistently or manually, leading to potential errors and breaches of sensitive information.

Manual redaction processes required significant time and effort, as each document had to be individually reviewed and edited to remove privileged content. This approach was prone to human error and could result in incomplete or inaccurate redactions. Furthermore, manual redaction processes did not provide real-time synchronization between the documents and their associated hyperlinks, making it challenging to ensure that the correct versions of documents were being accessed.

Limited control over document access was another issue with previous approaches. Non-privileged users often may have unintentionally had access to sensitive data, which posed a risk to the confidentiality of privileged information. There was a lack of privacy governance policies that could be applied in real-time to control access to sensitive content and ensure that only authorized individuals could view privileged information.

However, none of these approaches have provided a comprehensive solution that combines the features described and enabled by the present technology. The present technology addresses these limitations by providing a method for storing and managing documents in a source content library, synchronizing the documents with document hyperlinks in a target content retrieval library, and applying privacy redaction policies in real-time to control access to sensitive content. This method allows for efficient and accurate redaction of privileged information, ensuring that only the unprivileged content is displayed to non-privileged users.

SUMMARY

According to some embodiments, the present technology relate to a method, including: storing a plurality of documents in a source content library using a web-based, the plurality of documents in the source content library being unredacted and the plurality of documents in the source content library including a private content document, the private content document including unprivileged content and privileged content; storing a plurality of document hyperlinks in a target content retrieval library, the plurality of document hyperlinks being access hyperlinks for the plurality of documents in the source content library and the plurality of document hyperlinks including a private content document hyperlink, the private content document hyperlink being a hyperlink to the private content document; automatically synchronizing in real-time the plurality of documents in the source content library with the plurality of document hyperlinks in the target content retrieval library; receiving privacy redaction policies for the plurality of documents in the source content library, the privacy redaction policies including a privacy governance policy for the private content document; receiving an access request from a non-privileged user to access the private content document; accessing the private content document hyperlink in response to the access request from the non-privileged user to access the private content document; applying the privacy governance policy to the private content document in-real time at a time of providing access to the private content document; redacting the privileged content of the private content document at the time of providing access to the private content document, the redacting based on the privacy governance policy; and displaying the private content document to the non-privileged user using a user interface (UI), the displaying the private content document including redacting the privileged content at the time of the displaying the private content document to the non-privileged user and showing the unprivileged content to the non-privileged user.

In some aspects, the techniques described herein relate to a method, further including: receiving a privileged access request from a privileged user to access the private content document; accessing the private content document in the source content library in response to the privileged access request from the privileged user to access the private content document; and displaying the private content document to the privileged user using a user interface (UI), the displaying the private content document including showing the privileged content to the privileged user and showing the unprivileged content to the privileged user.

In some aspects, the techniques described herein relate to a method, further including: receiving a change to the private content document including a privileged content change; wherein the automatically synchronizing in real-time the plurality of documents in the source content library with the plurality of document hyperlinks in the target content retrieval library includes storing the privileged content change of the private content document in the source content library.

In some aspects, the techniques described herein relate to a method, further including: receiving an updated access request from the non-privileged user to access the private content document including the change to the private content document; accessing the private content document hyperlink in response to the updated access request from the non-privileged user to access the private content document; applying the privacy governance policy to the private content document in-real time at a time of providing access to the private content document; redacting the privileged content of the private content document including the change to the private content document at the time of providing access to the private content document, the redacting based on the privacy governance policy; and displaying the private content document to the non-privileged user using a user interface (UI), the displaying the private content document including redacting the privileged content change and the privileged content at the time of the displaying the private content document to the non-privileged user and showing the unprivileged content to the non-privileged user.

In some aspects, the techniques described herein relate to a method, further including: receiving an updated access request from the privileged user to access the private content document including the change to the private content document; accessing the private content document in the source content library in response to the updated access request from the privileged user to access the private content document; and displaying the private content document to the privileged user using a user interface (UI), the displaying the private content document including showing the privileged content change and the privileged content to the privileged user and showing the unprivileged content to the privileged user.

In some aspects, the techniques described herein relate to a method, further including: receiving a modified privacy redaction policy from a content repository administrator, the modified privacy redaction policy including a modification to the privacy redaction policies for the plurality of documents in the source content library, the modification to the privacy redaction policies including a modification to the privacy governance policy for the private content document, the modification to the privacy governance policy including modifying the privileged content change to an unprivileged content change.

In some aspects, the techniques described herein relate to a method, further including: receiving a modified access request from the non-privileged user to access the private content document including the privileged content change modified to an unprivileged content change; accessing the private content document hyperlink in response to the modified access request from the non-privileged user to access the private content document; applying the modification to the privacy governance policy to the private content document in-real time at a time of providing access to the private content document; un-redacting the change to the private content document at the time of providing access to the private content document, the un-redacting based on the modification to the privacy governance policy; and displaying the private content document to the non-privileged user using a user interface (UI), the displaying the private content document including un-redacting the privileged content change and at the time of the displaying the private content document to the non-privileged user and showing the unprivileged content to the non-privileged user.

In some aspects, the techniques described herein relate to a method, further including: receiving a change to the private content document including an unprivileged content change; wherein the automatically synchronizing in real-time the plurality of documents in the source content library with the plurality of document hyperlinks in the target content retrieval library includes storing the unprivileged content change of the private content document in the source content library.

In some aspects, the techniques described herein relate to a method, further including: receiving an updated access request from the non-privileged user to access the private content document including the change to the private content document; accessing the private content document hyperlink in response to the updated access request from the non-privileged user to access the private content document; applying the privacy governance policy to the private content document in-real time at a time of providing access to the private content document; redacting the privileged content of the private content document at the time of providing access to the private content document, the redacting based on the privacy governance policy; and displaying the private content document to the non-privileged user using a user interface (UI), the displaying the private content document including redacting the privileged content at the time of the displaying the private content document to the non-privileged user and showing the unprivileged content including the unprivileged content change to the non-privileged user.

In some aspects, the techniques described herein relate to a method, further including: receiving an updated access request from the privileged user to access the private content document including the unprivileged content change; accessing the private content document in the source content library in response to the updated access request from the privileged user to access the private content document; and displaying the private content document to the privileged user using a user interface (UI), the displaying the private content document including showing the privileged content to the privileged user and showing the unprivileged content including the unprivileged content change to the privileged user.

In some aspects, the techniques described herein relate to a method, further including: saving the modified privacy redaction policy from the content repository administrator to a redaction policy database, the saving the modified privacy redaction policy not saving another version of the private content document while saving the modified privacy redaction policy causing a reduction in memory necessary for a content repository compared with storing a plurality of redacted versions of the private content document.

In some aspects, the techniques described herein relate to a method, further including: receiving a modified privacy redaction policy from a content repository administrator, the modified privacy redaction policy including a modification to the privacy redaction policies for the plurality of documents in the source content library, the modification to the privacy redaction policies including a modification to the privacy governance policy for the private content document, the modification to the privacy governance policy including modifying the unprivileged content change to a privileged content change.

In some aspects, the techniques described herein relate to a method, further including: receiving a modified access request from the non-privileged user to access the private content document including the unprivileged content change to a privileged content change; accessing the private content document hyperlink in response to the modified access request from the non-privileged user to access the private content document; applying the modification to the privacy governance policy to the private content document in-real time at a time of providing access to the private content document; redacting the change to the private content document at the time of providing access to the private content document, the redacting based on the modification to the privacy governance policy; and displaying the private content document to the non-privileged user using a user interface (UI), the displaying the private content document including redacting the privileged content change at the time of the displaying the private content document to the non-privileged user and showing the unprivileged content to the non-privileged user.

In some aspects, the techniques described herein relate to a method, further including: saving the modified privacy redaction policy from the content repository administrator to a redaction policy database, the saving the modified privacy redaction policy not saving another version of the private content document while saving the modified privacy redaction policy causing a reduction in memory necessary for a content repository compared with storing a plurality of redacted versions of the private content document.

In some aspects, the techniques described herein relate to a method, wherein the redacting based on the privacy governance policy includes content redaction rules, the content redaction rules including redacting sensitive personal information including redacting at least one of a social security number, a credit card number, a phone number, an email address, a medical record, and a financial account number; wherein redacting the privileged content at the time of the displaying the private content document to the non-privileged user is redacting the sensitive personal information.

In some aspects, the techniques described herein relate to a method, wherein the redacting based on the privacy governance policy includes content type redaction rules, the content type redaction rules including a collection of metadata for a category of content of the private content document.

In some aspects, the techniques described herein relate to a method, wherein the web-based is a document management and storage system.

In some aspects, the techniques described herein relate to a method, wherein the document management and storage system is SharePoint.

In some aspects, the techniques described herein relate to an apparatus, including: at least one memory storing computer program instructions; and at least one processor configured to execute the computer program instructions to cause the apparatus at least to perform the following operations: storing a plurality of documents in a source content library using a web-based, the plurality of documents in the source content library being unredacted and the plurality of documents in the source content library including a private content document, the private content document including unprivileged content and privileged content; storing a plurality of document hyperlinks in a target content retrieval library, the plurality of document hyperlinks being access hyperlinks for the plurality of documents in the source content library and the plurality of document hyperlinks including a private content document hyperlink, the private content document hyperlink being a hyperlink to the private content document; automatically synchronizing in real-time the plurality of documents in the source content library with the plurality of document hyperlinks in the target content retrieval library; receiving privacy redaction policies for the plurality of documents in the source content library, the privacy redaction policies including a privacy governance policy for the private content document; receiving an access request from a non-privileged user to access the private content document; accessing the private content document hyperlink in response to the access request from the non-privileged user to access the private content document; applying the privacy governance policy to the private content document in-real time at a time of providing access to the private content document; redacting the privileged content of the private content document at the time of providing access to the private content document, the redacting based on the privacy governance policy; and displaying the private content document to the non-privileged user using a user interface (UI), the displaying the private content document including redacting the privileged content at the time of the displaying the private content document to the non-privileged user and showing the unprivileged content to the non-privileged user.

In some aspects, the techniques described herein relate to a non-transient computer-readable storage medium including instructions being executable by one or more processors to perform operations, the operations including: storing a plurality of documents in a source content library using a web-based, the plurality of documents in the source content library being unredacted and the plurality of documents in the source content library including a private content document, the private content document including unprivileged content and privileged content; storing a plurality of document hyperlinks in a target content retrieval library, the plurality of document hyperlinks being access hyperlinks for the plurality of documents in the source content library and the plurality of document hyperlinks including a private content document hyperlink, the private content document hyperlink being a hyperlink to the private content document; automatically synchronizing in real-time the plurality of documents in the source content library with the plurality of document hyperlinks in the target content retrieval library; receiving privacy redaction policies for the plurality of documents in the source content library, the privacy redaction policies including a privacy governance policy for the private content document; receiving an access request from a non-privileged user to access the private content document; accessing the private content document hyperlink in response to the access request from the non-privileged user to access the private content document; applying the privacy governance policy to the private content document in-real time at a time of providing access to the private content document; redacting the privileged content of the private content document at the time of providing access to the private content document, the redacting based on the privacy governance policy; and displaying the private content document to the non-privileged user using a user interface (UI), the displaying the private content document including redacting the privileged content at the time of the displaying the private content document to the non-privileged user and showing the unprivileged content to the non-privileged user.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 5 shows an exemplary method for personalized redaction of documents in a web-based collaborative platform including redacting the privileged content of the private content document at the time of providing access to the private content document, according to various embodiments of the present technology.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

The present technology enables personalized redaction of documents in a web-based collaborative platform. For example, personalized redaction of SharePoint documents. In some embodiments, a SharePoint target content retrieval presents redacted documents to SharePoint users based on rules to define which document data is redacted based on user identification (ID) and/or user groups (e.g., group that a user is a member of). In various embodiments, SharePoint is a web-based collaborative platform that integrates natively with Microsoft Office. SharePoint may be used as a document management and storage system, but SharePoint is highly configurable. For example, privileged users may manage unredacted documents in a source content library comprising unredacted documents. Non-privileged users access redacted versions of these documents in a target content retrieval library. The content redacted is personalized based on information about the SharePoint user such as user ID and/or group according to various embodiments.

A problem with web-based collaborative platforms is the need to have different renditions or versions of a shared document with different levels of redaction applied depending on the access privileges of each user. The present technology provides a solution by presenting documents to web-based collaborative platforms users (e.g., SharePoint users) where redacted content is specific to the user and/or user groups. For example, redaction of document content occurs at the time the document is presented to each end user, eliminating the need to maintain different renditions of a document with distinct levels of redaction applied to the document, therefore, decreasing the memory necessary to store the documents and increasing the speed for access to redacted documents by users. For example, in some embodiments of the present technology the web-based collaborative platform is Microsoft-Teams and the present technology supports access of redacted documents for Microsoft-Teams users.

The present technology has the following advantages over alternative solutions. In various embodiments, the present technology provides personalized levels of redaction based on SharePoint user/group eliminating the need to store multiple revisions of documents for each different level of redaction. Therefore, the amount of memory necessary to store multiple revisions of documents is eliminated causing faster access to redacted documents by users.

In various embodiments, the present technology redacts content at the time content is presented to a user eliminating the need to store multiple revisions of redacted content for distinct levels of redaction. Therefore, the amount of memory necessary to store multiple revisions of documents is eliminated causing improved access to redacted documents by users.

In various embodiments, the present technology redacts content at the time a document is presented to a user and also allows redaction rules to be modified without the need to update a content of a redacted document being managed in SharePoint document libraries.

In various embodiments, the present technology returns redacted documents as a Portable Document Format (PDF) format as with other solutions but conversion from original file format supports other file types including text, and Microsoft-Office files (e.g., including Word®, PowerPoint® and Excel® formats). Furthermore, to PDF conversion may be done at the time of document presentation to the user eliminating the need for an intermediate step to convert to PDF, thus, increasing the speed for access to redacted documents by users compared to previous approaches.

Figure 1:
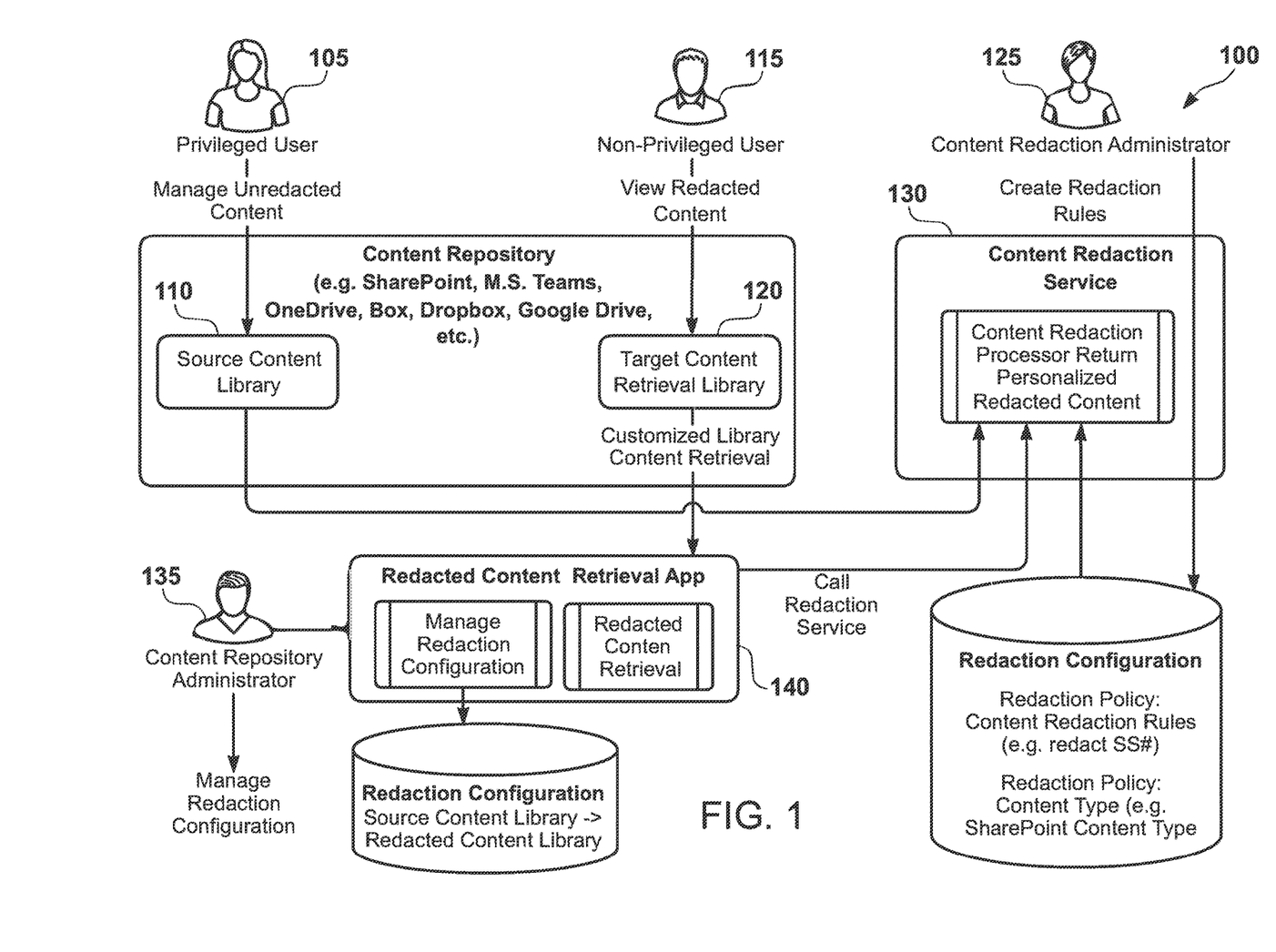
FIG. 1 shows a high-level block diagram of an exemplary system configured for personalized redaction of documents in a web-based collaborative platform, according to various embodiments of the present technology.

FIG. 1 shows a high-level block diagram of an exemplary system 100 configured for personalized redaction of documents in a web-based collaborative platform, according to the subject disclosure. FIG. 1 shows privileged users 105 with the ability to manage unredacted documents with access of a source content library 110 comprising unredacted documents and non-privileged users 115 with the ability to view redacted documents for a target content retrieval library 120. For example, a document library column may return a redacted file in various embodiments. For instance, the source content library 110 may be storing a plurality of documents in a source content library using a web-based collaborative platform, the plurality of documents in the source content library 110 being unredacted and the plurality of documents in the source content library 110 comprising a private content document, the private content document comprising unprivileged content and privileged content.

FIG. 1 shows the target content retrieval library 120 according to some embodiments. In various embodiments, a goal of the target content retrieval library 120 also referenced as the redacted documents library is to create a SharePoint redacted documents library where non-privileged users 115 access redacted documents by using the target content retrieval library 120. Content of documents may be personalized redaction based on SharePoint user/group in various embodiments. For instance, the target content retrieval library 120 may be storing a plurality of document hyperlinks in the target content retrieval library 120, the plurality of document hyperlinks being access hyperlinks for the plurality of documents in the source content library 110 and the plurality of document hyperlinks comprising a private content document hyperlink, the private content document hyperlink being a hyperlink to the private content document.

FIG. 1 further illustrates privileged users 105 and non-privileged users 115. The present technology enables privileged users 105 to manage redacted documents in the source content library 110 comprising unredacted documents. Redacted documents are available in the target content retrieval library 120 if there are redaction rules that apply to the document based on file type and SharePoint content type. The present technology enables non-privileged users 115 access to redacted documents using the target content retrieval library 120 and redaction rules are applied are based on the user/group and content type.

Significantly, according to various embodiments, the present technology enables document content to be redacted at the time documents are presented to users. The one or more computing platforms may be configured by machine-readable instructions (e.g., instructions 55 of FIG. 6). Machine-readable instructions (e.g., instructions 55 of FIG. 6) may include modules. The modules may be implemented as one or more of functional logic, hardware logic, electronic circuitry, software modules, and the like.

FIG. 1 illustrates content redaction administrators 125 (e.g., SharePoint administrators) according to various embodiments. The present technology enables automatically synchronizing in real-time the plurality of documents in the source content library 110 with the plurality of document hyperlinks in the target content retrieval library 120. For instance, the solution of the present technology automatically creates the target content retrieval library 120 comprising the plurality of document hyperlinks in the target content retrieval library 120, the plurality of document hyperlinks being access hyperlinks for the plurality of documents in the source content library 110. The content redaction administrators 125 may use a content redaction service 130 for automatically synchronizing in real-time the plurality of documents in the source content library 110 with the plurality of document hyperlinks in the target content retrieval library 120. For example, the present technology may grant access for non-privileged users 115 to view redacted documents using the target content retrieval library 120. FIG. 1 further shows redaction administrators. The present technology enables the content redaction administrators 125 to configure redaction rules based on users/groups and content type of documents that these rules apply to by managing access to the unredacted documents that are stored in the source content library 110 by providing access to the plurality of document hyperlinks in the target content retrieval library 120.

According to various embodiments the content redaction administrators 125 may manage redaction configuration including redactions policy including content redaction rules and content type redaction rules. For example, the redacting based on the privacy governance policy may comprise content redaction rules, the content redaction rules comprising redacting sensitive personal information comprising redacting at least one of a social security number, a credit card number, a phone number, an email address, a medical record, and a financial account number; wherein redacting the privileged content at the time of the displaying the private content document to the non-privileged user is redacting the sensitive personal information. For example, the redacting based on the privacy governance policy may comprise content type redaction rules, the content type redaction rules comprising a collection of metadata for a category of content of the private content document.

FIG. 1 illustrates content repository administrators 135 (e.g., SharePoint administrators) according to various embodiments. The content repository administrators 135 may use the redacted content retrieval application 140 for receiving privacy redaction policies for the plurality of documents in the source content library 110, the privacy redaction policies comprising a privacy governance policy for the private content document; receiving an access request from a non-privileged user 115 to access the private content document; accessing the private content document hyperlink in response to the access request from the non-privileged user 115 to access the private content document; applying the privacy governance policy to the private content document in-real time at a time of providing access to the private content document; redacting the privileged content of the private content document at the time of providing access to the private content document, the redacting based on the privacy governance policy; and displaying the private content document to the non-privileged user 115 using a user interface (UI), the displaying the private content document comprising redacting the privileged content at the time of the displaying the private content document to the non-privileged user 115 and showing the unprivileged content to the non-privileged user 115.

According to various embodiments the content repository administrators 135 may use the redacted content retrieval application 140 for receiving a privileged access request from a privileged user 105 to access the private content document; accessing the private content document in the source content library 110 in response to the privileged access request from the privileged user 105 to access the private content document; and displaying the private content document to the privileged user 105 using a user interface (UI), the displaying the private content document comprising showing the privileged content to the privileged user 105 and showing the unprivileged content to the privileged user 105.

According to various embodiments the content redaction administrators 125 may use a content redaction service 130 for receiving a change to the private content document comprising a privileged content change; wherein the automatically synchronizing in real-time the plurality of documents in the source content library 110 with the plurality of document hyperlinks in the target content retrieval library 120 comprises storing the privileged content change of the private content document in the source content library 110.

According to various embodiments the content repository administrator 135 may use the redacted content retrieval application 140 for receiving an updated access request from the non-privileged user 115 to access the private content document including the change to the private content document; accessing the private content document hyperlink in response to the updated access request from the non-privileged user 115 to access the private content document; applying the privacy governance policy to the private content document in-real time at a time of providing access to the private content document; redacting the privileged content of the private content document including the change to the private content document at the time of providing access to the private content document, the redacting based on the privacy governance policy; and displaying the private content document to the non-privileged user using a user interface (UI), the displaying the private content document comprising redacting the privileged content change and the privileged content at the time of the displaying the private content document to the non-privileged user 115 and showing the unprivileged content to the non-privileged user 115.

According to various embodiments the content repository administrators 135 may use the redacted content retrieval application 140 for receiving an updated access request from the privileged user 105 to access the private content document including the change to the private content document; accessing the private content document in the source content library in response to the updated access request from the privileged user 105 to access the private content document; and displaying the private content document to the privileged user 105 using a user interface (UI), the displaying the private content document comprising showing the privileged content change and the privileged content to the privileged user 105 and showing the unprivileged content to the privileged user.

According to various embodiments the content redaction administrators 125 may use the content redaction service 130 for receiving a modified privacy redaction policy from the content repository administrator 135, the modified privacy redaction policy comprising a modification to the privacy redaction policies for the plurality of documents in the source content library 110, the modification to the privacy redaction policies comprising a modification to the privacy governance policy for the private content document, the modification to the privacy governance policy comprising modifying the privileged content change to an unprivileged content change.

According to various embodiments the content redaction administrators 125 may use the content redaction service 130 for receiving a modified access request from the non-privileged user 115 to access the private content document including the privileged content change modified to an unprivileged content change; accessing the private content document hyperlink in response to the modified access request from the non-privileged user 115 to access the private content document; applying the modification to the privacy governance policy to the private content document in-real time at a time of providing access to the private content document; un-redacting the change to the private content document at the time of providing access to the private content document, the un-redacting based on the modification to the privacy governance policy; and displaying the private content document to the non-privileged user 115 using a user interface (UI), the displaying the private content document comprising un-redacting the privileged content change and at the time of the displaying the private content document to the non-privileged user 115 and showing the unprivileged content to the non-privileged user 115.

According to various embodiments the content redaction administrators 125 may use the content redaction service 130 for receiving a change to the private content document comprising an unprivileged content change; wherein the automatically synchronizing in real-time the plurality of documents in the source content library 110 with the plurality of document hyperlinks in the target content retrieval library 120 comprises storing the unprivileged content change of the private content document in the source content library 110.

According to various embodiments the content redaction administrators 125 may use the content redaction service 130 for receiving an updated access request from the non-privileged user 115 to access the private content document including the change to the private content document; accessing the private content document hyperlink in response to the updated access request from the non-privileged user 115 to access the private content document; applying the privacy governance policy to the private content document in-real time at a time of providing access to the private content document; redacting the privileged content of the private content document at the time of providing access to the private content document, the redacting based on the privacy governance policy; and displaying the private content document to the non-privileged user 115 using a user interface (UI), the displaying the private content document comprising redacting the privileged content at the time of the displaying the private content document to the non-privileged user 115 and showing the unprivileged content including the unprivileged content change to the non-privileged user 115.

According to various embodiments the content redaction administrators 125 may use the content redaction service 130 for receiving an updated access request from the privileged user 105 to access the private content document including the unprivileged content change; accessing the private content document in the source content library 110 in response to the updated access request from the privileged user 105 to access the private content document; and displaying the private content document to the privileged user 105 using a user interface (UI), the displaying the private content document comprising showing the privileged content to the privileged user 105 and showing the unprivileged content including the unprivileged content change to the privileged user.

According to various embodiments the content redaction administrators 125 may use the content redaction service 130 for saving the modified privacy redaction policy from the content repository administrator 135 to a redaction policy database, the saving the modified privacy redaction policy not saving another version of the private content document while saving the modified privacy redaction policy causing a reduction in memory necessary for a content repository compared with storing a plurality of redacted versions of the private content document.

According to various embodiments the content redaction administrators 125 may use the content redaction service 130 for receiving a modified privacy redaction policy from a content repository administrator 135, the modified privacy redaction policy comprising a modification to the privacy redaction policies for the plurality of documents in the source content library 110, the modification to the privacy redaction policies comprising a modification to the privacy governance policy for the private content document, the modification to the privacy governance policy comprising modifying the unprivileged content change to a privileged content change.

According to various embodiments the content redaction administrators 125 may use the content redaction service 130 for receiving a modified access request from the non-privileged user 115 to access the private content document including the unprivileged content change to a privileged content change; accessing the private content document hyperlink in response to the modified access request from the non-privileged user 115 to access the private content document; applying the modification to the privacy governance policy to the private content document in-real time at a time of providing access to the private content document; redacting the change to the private content document at the time of providing access to the private content document, the redacting based on the modification to the privacy governance policy; and displaying the private content document to the non-privileged user 115 using a user interface (UI), the displaying the private content document comprising redacting the privileged content change at the time of the displaying the private content document to the non-privileged user 115 and showing the unprivileged content to the non-privileged user.

According to various embodiments the content redaction administrators 125 may use the content redaction service 130 for saving the modified privacy redaction policy from the content repository administrator 135 to a redaction policy database, the saving the modified privacy redaction policy not saving another version of the private content document while saving the modified privacy redaction policy causing a reduction in memory necessary for a content repository compared with storing a plurality of redacted versions of the private content document.

According to various embodiments the web-based is a document management and storage system. According to some embodiments the document management and storage system is SharePoint.

Figure 2:
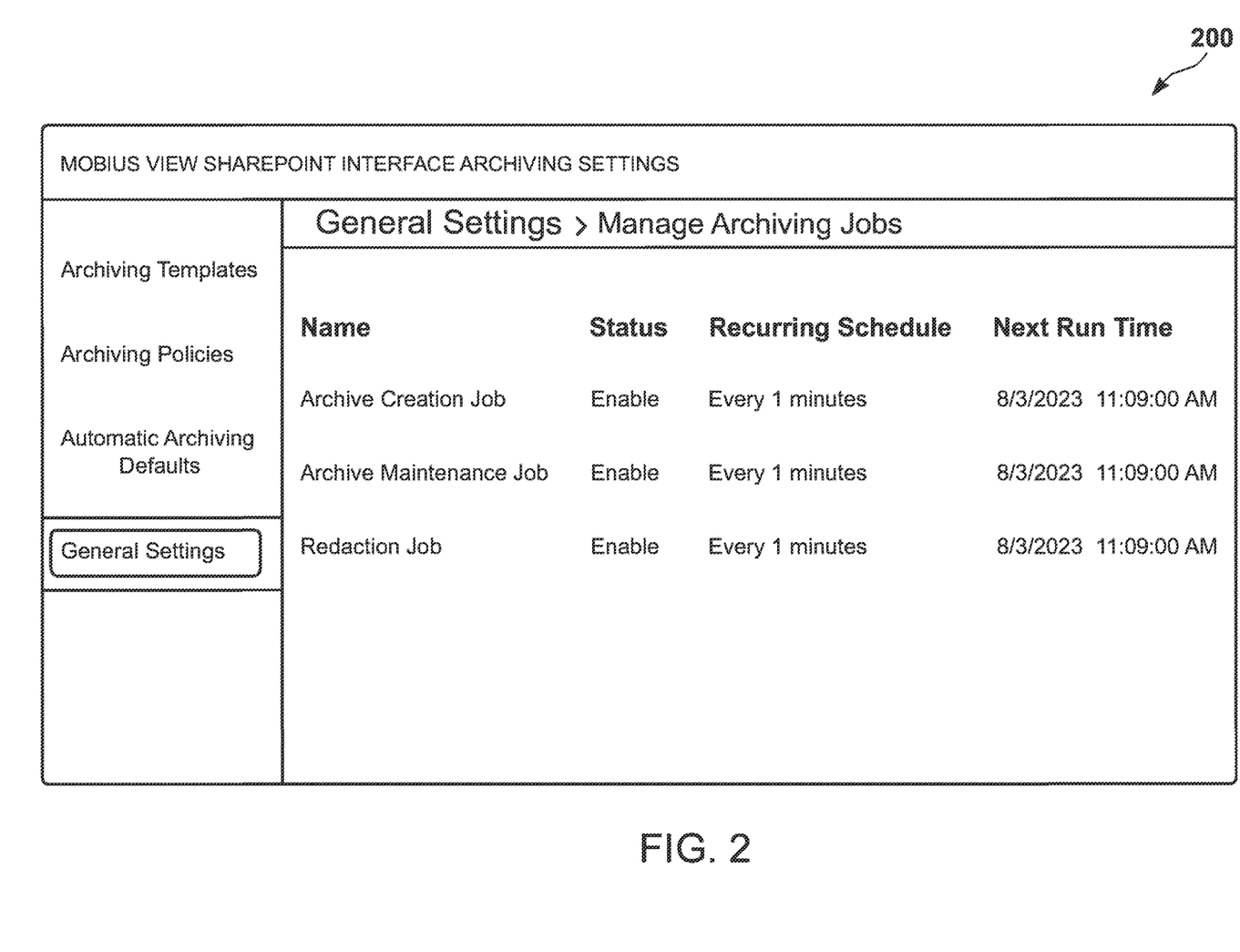
FIG. 2 shows an exemplary user interface (UI) for personalized redaction of documents in a web-based collaborative platform including automatically synchronizing in real-time the plurality of documents in the source content library with the plurality of document hyperlinks in the target content retrieval library, according to various embodiments of the present technology.

FIG. 2 shows an exemplary user interface (UI) 200 for personalized redaction of documents in a web-based collaborative platform including automatically synchronizing in real-time the plurality of documents in the source content library 110 with the plurality of document hyperlinks in the target content retrieval library 120, according to various embodiments of the present technology. For example, the exemplary user interface (UI) 200 may be used for automatically synchronizing in real-time the plurality of documents in the source content library with the plurality of document hyperlinks in the target content retrieval library including adjusting archiving setting that be personalized by user.

Figure 3:
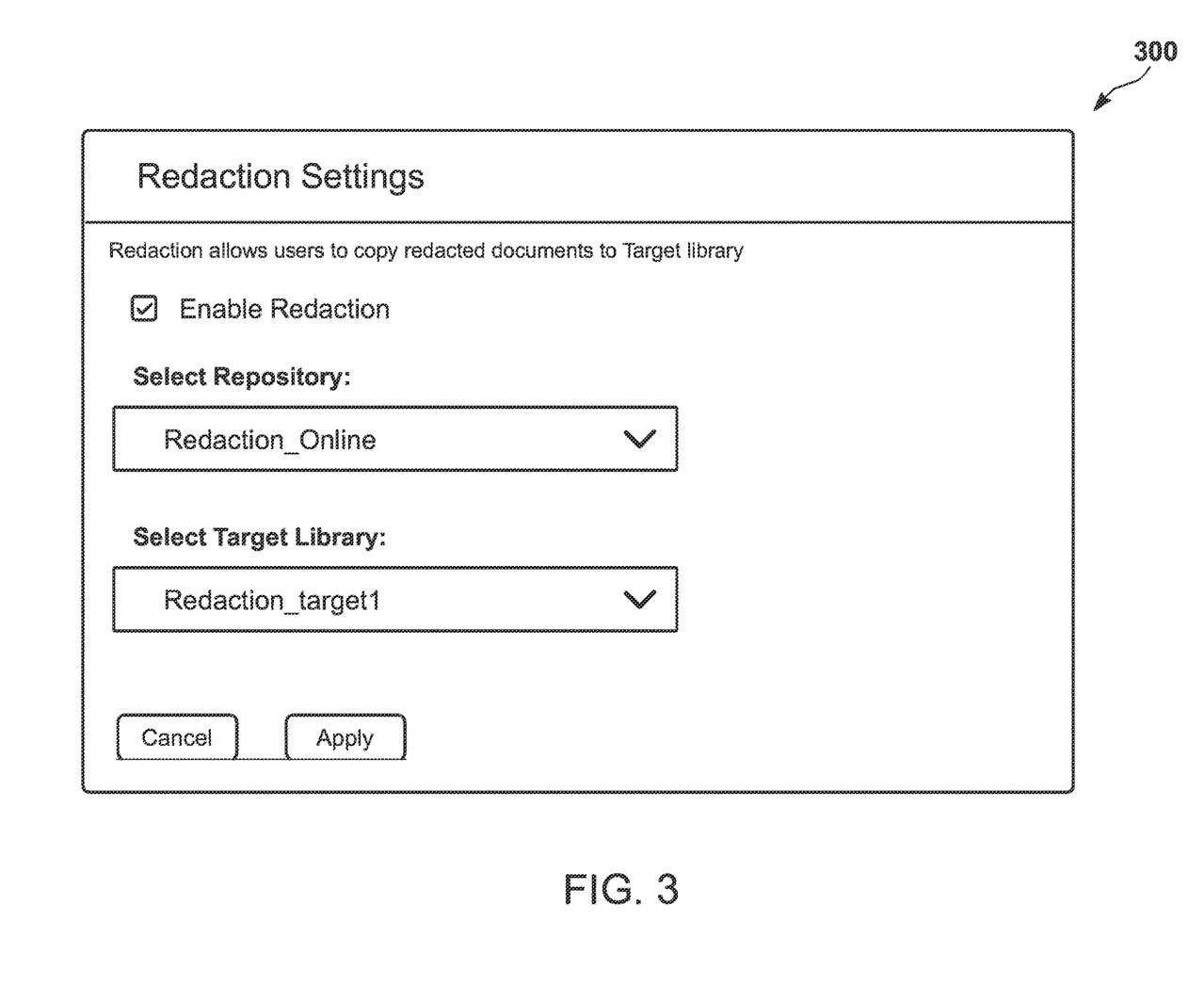
FIG. 3 shows an exemplary user interface (UI) for personalized redaction of documents in a web-based collaborative platform including applying the privacy governance policy to the private content document in-real time at a time of providing access to the private content document, according to various embodiments of the present technology.

FIG. 3 shows an exemplary user interface (UI) 300 for personalized redaction of documents in a web-based collaborative platform including applying the privacy governance policy to the private content document in-real time at a time of providing access to the private content document, according to various embodiments of the present technology. For example, the exemplary user interface (UI) 300 may be used for automatically synchronizing in real-time the plurality of documents in the source content library 110 with the plurality of document hyperlinks in the target content retrieval library 120. According to various embodiments the content redaction administrators 125 may use the content redaction service 130 for receiving a modified privacy redaction policy from the content repository administrator 135, the modified privacy redaction policy comprising a modification to the privacy redaction policies for the plurality of documents in the source content library 110, the modification to the privacy redaction policies comprising a modification to the privacy governance policy for the private content document, the modification to the privacy governance policy comprising modifying the privileged content change to an unprivileged content change.

Figure 4:
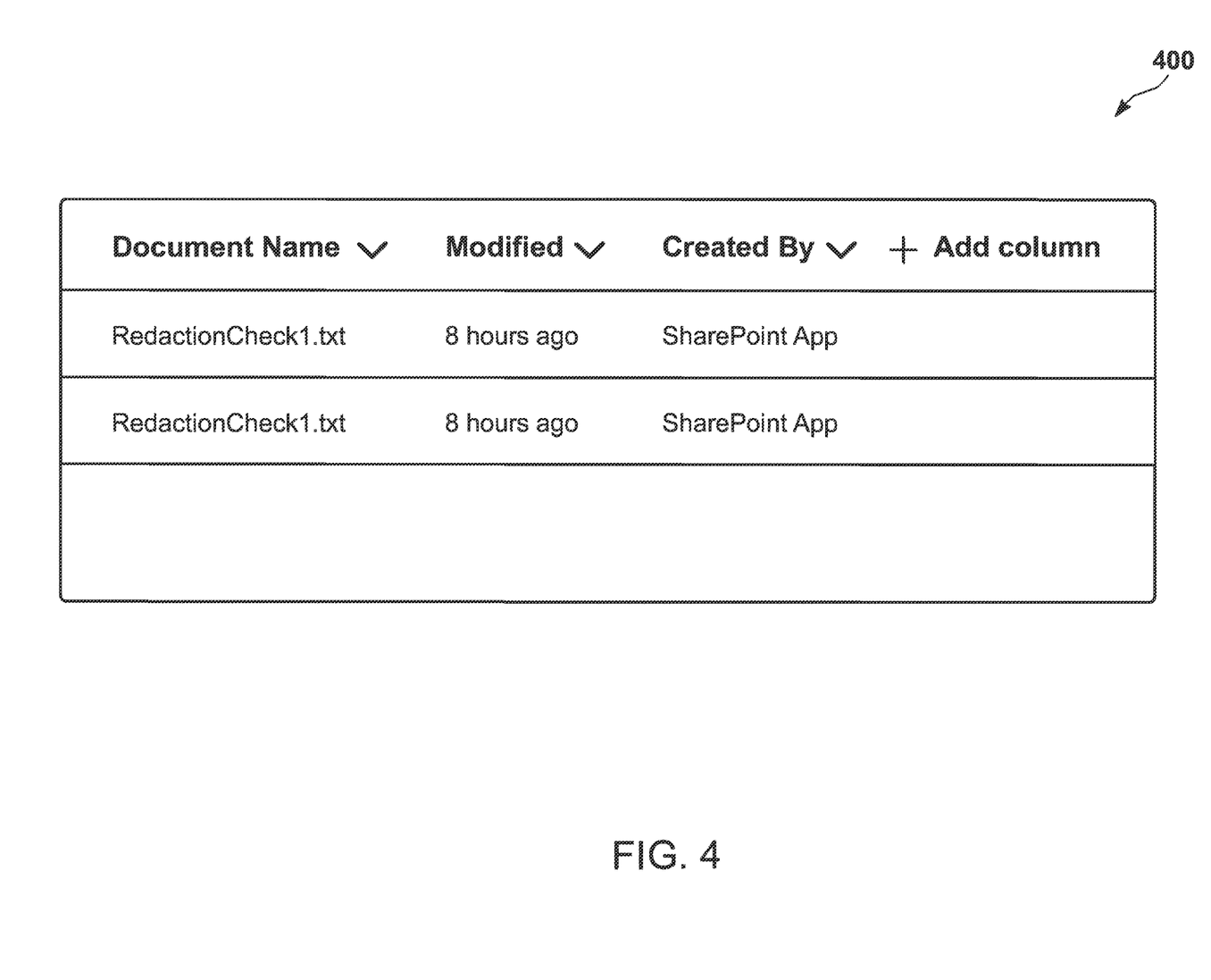
FIG. 4 shows an exemplary user interface (UI) for personalized redaction of documents in a web-based collaborative platform including redacting the privileged content of the private content document at the time of providing access to the private content document, the redacting based on the privacy governance policy, according to various embodiments of the present technology.

FIG. 4 shows an exemplary user interface (UI) 400 for personalized redaction of documents in a web-based collaborative platform including redacting the privileged content of the private content document at the time of providing access to the private content document, the redacting based on the privacy governance policy, according to various embodiments of the present technology.

FIG. 5 shows an exemplary method 500 for personalized redaction of documents in a web-based collaborative platform including redacting the privileged content of the private content document at the time of providing access to the private content document, according to various embodiments of the present technology. FIG. 5 is a flowchart of an example method 500 for personalized redaction of documents in a web-based collaborative platform. The method 500, comprising the following steps or operations.

At step 510, according to various embodiments of the present technology, comprises storing a plurality of documents in a source content library 110 using a web-based collaborative platform, the plurality of documents in the source content library 110 being unredacted and the plurality of documents in the source content library 110 comprising a private content document, the private content document comprising unprivileged content and privileged content.

At step 520, according to various embodiments of the present technology, comprises storing a plurality of document hyperlinks in a target content retrieval library 120, the plurality of document hyperlinks being access hyperlinks for the plurality of documents in the source content library 110 and the plurality of document hyperlinks comprising a private content document hyperlink, the private content document hyperlink being a hyperlink to the private content document.

At step 530, according to various embodiments of the present technology, comprises automatically synchronizing in real-time the plurality of documents in the source content library 110 with the plurality of document hyperlinks in the target content retrieval library 120.

At step 540, according to various embodiments of the present technology, comprises receiving privacy redaction policies for the plurality of documents in the source content library 110, the privacy redaction policies comprising a privacy governance policy for the private content document. For example, privacy governance policy may be guidelines that that an organization follows to ensure the protection of personal information and data privacy. The privacy governance policy may apply to all employees, contractors, partners, and stakeholders that have access to a web-based document sharing platform.

At step 550, according to various embodiments of the present technology, comprises receiving an access request from a non-privileged user 115 to access the private content document.

At step 560, according to various embodiments of the present technology, comprises accessing the private content document hyperlink in response to the access request from the non-privileged user 115 to access the private content document.

At step 570, according to various embodiments of the present technology, comprises applying the privacy governance policy to the private content document in-real time at a time of providing access to the private content document.

At step 580, according to various embodiments of the present technology, comprises redacting the privileged content of the private content document at the time of providing access to the private content document, the redacting based on the privacy governance policy.

At step 590, according to various embodiments of the present technology, comprises displaying the private content document to the non-privileged user 115 using a user interface (UI), the displaying the private content document comprising redacting the privileged content at the time of the displaying the private content document to the non-privileged user 115 and showing the unprivileged content to the non-privileged user.

Figure 6:
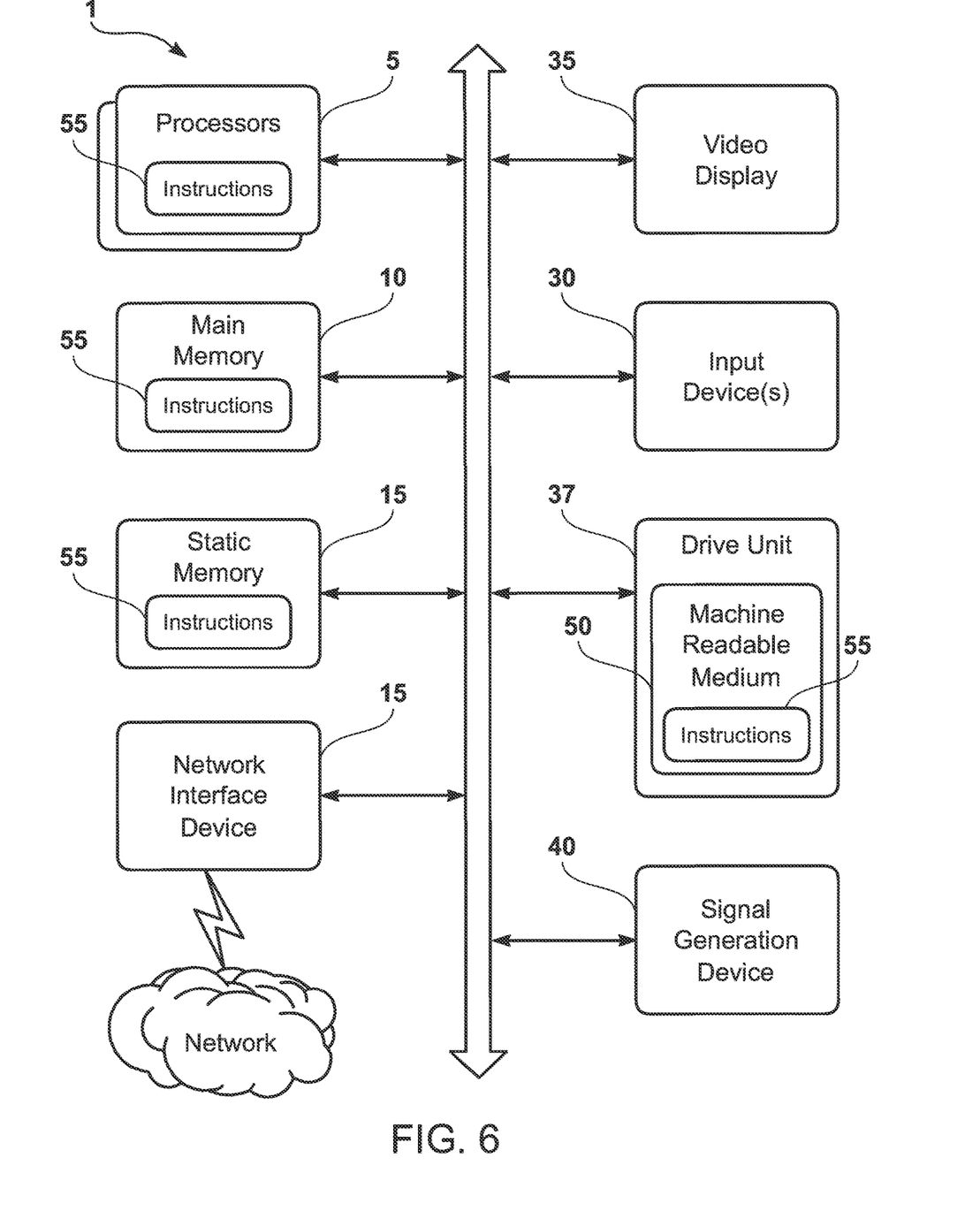
FIG. 6 illustrates an exemplary computer system that may be used to implement embodiments of the present disclosure, according to various embodiments of the present technology.

FIG. 6 illustrates an exemplary computer system that may be used to implement embodiments of the present disclosure FIG. 6 shows a diagrammatic representation of a computing device for a machine in the example electronic form of a computer system 1, within which a set of instructions for causing the machine to perform any one or more of the methodologies discussed herein can be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the description, for purposes of explanation and not limitation, specific details are set forth, such as particular embodiments, procedures, techniques, and so forth, in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

Thus, the present technology for personalized redaction of documents in a web-based collaborative platform is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method, comprising:
   storing a plurality of documents in a source content library using a web-based collaborative platform, the plurality of documents in the source content library being unredacted and the plurality of documents in the source content library comprising a private content document, the private content document comprising unprivileged content and privileged content;
   storing a plurality of document hyperlinks in a target content retrieval library, the plurality of document hyperlinks being access hyperlinks for the plurality of documents in the source content library and the plurality of document hyperlinks comprising a private content document hyperlink, the private content document hyperlink being a hyperlink to the private content document;

automatically synchronizing in real-time the plurality of documents in the source content library with the plurality of document hyperlinks in the target content retrieval library;

receiving privacy redaction policies for the plurality of documents in the source content library, the privacy redaction policies comprising a privacy governance policy for the private content document;

receiving an access request from a non-privileged user to access the private content document;

accessing the private content document hyperlink in response to the access request from the non-privileged user to access the private content document;

applying the privacy governance policy to the private content document in-real time at a time of providing access to the private content document;

redacting the privileged content of the private content document at the time of providing access to the private content document, the redacting based on the privacy governance policy; and displaying the private content document to the non-privileged user using a user interface (UI), the displaying the private content document comprising redacting the privileged content at the time of the displaying the private content document to the non-privileged user and showing the unprivileged content to the non-privileged user.

2. The method as recited in claim 1, further comprising:
receiving a privileged access request from a privileged user to access the private content document;
accessing the private content document in the source content library in response to the privileged access request from the privileged user to access the private content document; and
displaying the private content document to the privileged user using a user interface (UI), the displaying the private content document comprising showing the privileged content to the privileged user and showing the unprivileged content to the privileged user.

3. The method as recited in claim 1, further comprising:
receiving a change to the private content document comprising a privileged content change;
wherein the automatically synchronizing in real-time the plurality of documents in the source content library with the plurality of document hyperlinks in the target content retrieval library comprises storing the privileged content change of the private content document in the source content library.

4. The method as recited in claim 3, further comprising:
receiving an updated access request from the non-privileged user to access the private content document including the change to the private content document;
accessing the private content document hyperlink in response to the updated access request from the non-privileged user to access the private content document;
applying the privacy governance policy to the private content document in-real time at a time of providing access to the private content document;
redacting the privileged content of the private content document including the change to the private content document at the time of providing access to the private content document, the redacting based on the privacy governance policy; and displaying the private content document to the non-privileged user using a user interface (UI), the displaying the private content document comprising redacting the privileged content change and the privileged content at the time of the displaying the private content document to the non-privileged user and showing the unprivileged content to the non-privileged user.

5. The method as recited in claim 3, further comprising:
receiving an updated access request from the privileged user to access the private content document including the change to the private content document;
accessing the private content document in the source content library in response to the updated access request from the privileged user to access the private content document; and
displaying the private content document to the privileged user using a user interface (UI), the displaying the private content document comprising showing the privileged content change and the privileged content to the privileged user and showing the unprivileged content to the privileged user.

6. The method as recited in claim 3, further comprising:
receiving a modified privacy redaction policy from a content repository administrator, the modified privacy redaction policy comprising a modification to the privacy redaction policies for the plurality of documents in the source content library, the modification to the privacy redaction policies comprising a modification to the privacy governance policy for the private content document, the modification to the privacy governance policy comprising modifying the privileged content change to an unprivileged content change.

7. The method as recited in claim 6, further comprising:
receiving a modified access request from the non-privileged user to access the private content document including the privileged content change modified to an unprivileged content change;
accessing the private content document hyperlink in response to the modified access request from the non-privileged user to access the private content document;
applying the modification to the privacy governance policy to the private content document in-real time at a time of providing access to the private content document;
un-redacting the change to the private content document at the time of providing access to the private content document, the un-redacting based on the modification to the privacy governance policy; and
displaying the private content document to the non-privileged user using a user interface (UI), the displaying the private content document comprising un-redacting the privileged content change and at the time of the displaying the private content document to the non-privileged user and showing the unprivileged content to the non-privileged user.

8. The method as recited in claim 1, further comprising:
receiving a change to the private content document comprising an unprivileged content change;
wherein the automatically synchronizing in real-time the plurality of documents in the source content library with the plurality of document hyperlinks in the target content retrieval library comprises storing the unprivileged content change of the private content document in the source content library.

9. The method as recited in claim 8, further comprising:
receiving an updated access request from the non-privileged user to access the private content document including the change to the private content document;
accessing the private content document hyperlink in response to the updated access request from the non-privileged user to access the private content document;
applying the privacy governance policy to the private content document in-real time at a time of providing access to the private content document;
redacting the privileged content of the private content document at the time of providing access to the private content document, the redacting based on the privacy governance policy; and
displaying the private content document to the non-privileged user using a user interface (UI), the displaying the private content document comprising redacting the privileged content at the time of the displaying the private content document to the non-privileged user and showing the unprivileged content including the unprivileged content change to the non-privileged user.

10. The method as recited in claim 9, further comprising:
receiving an updated access request from the privileged user to access the private content document including the unprivileged content change;
accessing the private content document in the source content library in response to the updated access request from the privileged user to access the private content document; and
displaying the private content document to the privileged user using a user interface (UI), the displaying the private content document comprising showing the privileged content to the privileged user and showing the unprivileged content including the unprivileged content change to the privileged user.

11. The method as recited in claim 6, further comprising:
saving the modified privacy redaction policy from the content repository administrator to a redaction policy database, the saving the modified privacy redaction policy not saving another version of the private content document while saving the modified privacy redaction policy causing a reduction in memory necessary for a content repository compared with storing a plurality of redacted versions of the private content document.

12. The method as recited in claim 8, further comprising:
receiving a modified privacy redaction policy from a content repository administrator, the modified privacy redaction policy comprising a modification to the privacy redaction policies for the plurality of documents in the source content library, the modification to the privacy redaction policies comprising a modification to the privacy governance policy for the private content document, the modification to the privacy governance policy comprising modifying the unprivileged content change to a privileged content change.

13. The method as recited in claim 12, further comprising:
receiving a modified access request from the non-privileged user to access the private content document including the unprivileged content change to a privileged content change;
accessing the private content document hyperlink in response to the modified access request from the non-privileged user to access the private content document;
applying the modification to the privacy governance policy to the private content document in-real time at a time of providing access to the private content document;
redacting the change to the private content document at the time of providing access to the private content document, the redacting based on the modification to the privacy governance policy; and
displaying the private content document to the non-privileged user using a user interface (UI), the displaying the private content document comprising redacting the privileged content change at the time of the displaying the private content document to the non-privileged user and showing the unprivileged content to the non-privileged user.

14. The method as recited in claim 13, further comprising:
saving the modified privacy redaction policy from the content repository administrator to a redaction policy database, the saving the modified privacy redaction policy not saving another version of the private content document while saving the modified privacy redaction policy causing a reduction in memory necessary for a content repository compared with storing a plurality of redacted versions of the private content document.

15. The method as recited in claim 1,
wherein the redacting based on the privacy governance policy comprises content redaction rules, the content redaction rules comprising redacting sensitive personal information comprising redacting at least one of a social security number, a credit card number, a phone number, an email address, a medical record, and a financial account number;
wherein redacting the privileged content at the time of the displaying the private content document to the non-privileged user is redacting the sensitive personal information.

16. The method as recited in claim 1, wherein the redacting based on the privacy governance policy comprises content type redaction rules, the content type redaction rules comprising a collection of metadata for a category of content of the private content document.

17. The method as recited in claim 1, wherein the web-based collaborative platform is a document management and storage system.

18. The method as recited in claim 17, wherein the document management and storage system is SharePoint.

19. An apparatus, comprising:
at least one memory storing computer program instructions; and
at least one processor configured to execute the computer program instructions to cause the apparatus at least to perform the following operations:
storing a plurality of documents in a source content library using a web-based collaborative platform, the plurality of documents in the source content library being unredacted and the plurality of documents in the source content library comprising a private content document, the private content document comprising unprivileged content and privileged content;
storing a plurality of document hyperlinks in a target content retrieval library, the plurality of document hyperlinks being access hyperlinks for the plurality of documents in the source content library and the plurality of document hyperlinks comprising a private content document hyperlink, the private content document hyperlink being a hyperlink to the private content document;
automatically synchronizing in real-time the plurality of documents in the source content library with the plurality of document hyperlinks in the target content retrieval library;

receiving privacy redaction policies for the plurality of documents in the source content library, the privacy redaction policies comprising a privacy governance policy for the private content document;

receiving an access request from a non-privileged user to access the private content document;

accessing the private content document hyperlink in response to the access request from the non-privileged user to access the private content document;

applying the privacy governance policy to the private content document in-real time at a time of providing access to the private content document;

redacting the privileged content of the private content document at the time of providing access to the private content document, the redacting based on the privacy governance policy; and displaying the private content document to the non-privileged user using a user interface (UI), the displaying the private content document comprising redacting the privileged content at the time of the displaying the private content document to the non-privileged user and showing the unprivileged content to the non-privileged user.

20. A non-transient computer-readable storage medium comprising instructions being executable by one or more processors to perform operations, the operations comprising:

storing a plurality of documents in a source content library using a web-based collaborative platform, the plurality of documents in the source content library being unredacted and the plurality of documents in the source content library comprising a private content document, the private content document comprising unprivileged content and privileged content;

storing a plurality of document hyperlinks in a target content retrieval library, the plurality of document hyperlinks being access hyperlinks for the plurality of documents in the source content library and the plurality of document hyperlinks comprising a private content document hyperlink, the private content document hyperlink being a hyperlink to the private content document;

automatically synchronizing in real-time the plurality of documents in the source content library with the plurality of document hyperlinks in the target content retrieval library;

receiving privacy redaction policies for the plurality of documents in the source content library, the privacy redaction policies comprising a privacy governance policy for the private content document;

receiving an access request from a non-privileged user to access the private content document;

accessing the private content document hyperlink in response to the access request from the non-privileged user to access the private content document;

applying the privacy governance policy to the private content document in-real time at a time of providing access to the private content document;

redacting the privileged content of the private content document at the time of providing access to the private content document, the redacting based on the privacy governance policy; and displaying the private content document to the non-privileged user using a user interface (UI), the displaying the private content document comprising redacting the privileged content at the time of the displaying the private content document to the non-privileged user and showing the unprivileged content to the non-privileged user.

* * * * *